United States Patent
Hutchin et al.

(10) Patent No.: US 8,292,441 B2
(45) Date of Patent: Oct. 23, 2012

(54) DEFORMABLE MIRROR

(75) Inventors: Richard A. Hutchin, Calabasas, CA (US); Matthew T. Hunwardsen, Simi Valley, CA (US); Marc T. Jacoby, West Hills, CA (US)

(73) Assignee: Optical Physics Company, Calabasis, CA (US)

( * ) Notice: Subject to any disclaimer, the term of this patent is extended or adjusted under 35 U.S.C. 154(b) by 260 days.

(21) Appl. No.: 12/368,626

(22) Filed: Feb. 10, 2009

(65) Prior Publication Data

US 2010/0202070 A1    Aug. 12, 2010

(51) Int. Cl.
*G02B 5/08* (2006.01)
*G02B 7/182* (2006.01)

(52) U.S. Cl. ...................................................... 359/849

(58) Field of Classification Search .................. 359/849, 359/290–291, 846
See application file for complete search history.

(56) References Cited

U.S. PATENT DOCUMENTS

| | | | |
|---|---|---|---|
| 4,679,915 A | 7/1987 | Kriz et al. | |
| 4,794,345 A | 12/1988 | Linford et al. | |
| 4,825,062 A * | 4/1989 | Rather et al. | 250/201.1 |
| 4,844,603 A | 7/1989 | Eitel et al. | |
| 4,934,803 A * | 6/1990 | Ealey | 359/845 |
| 4,944,580 A * | 7/1990 | MacDonald et al. | 359/849 |
| 5,037,190 A | 8/1991 | Ealey et al. | |
| 5,535,043 A | 7/1996 | La Fiandra et al. | |
| 5,617,261 A | 4/1997 | Bar et al. | |
| 5,777,807 A | 7/1998 | Bar et al. | |
| 5,917,644 A | 6/1999 | LaFiandra | |
| 6,236,490 B1 | 5/2001 | Shen | |
| 6,724,517 B2 | 4/2004 | Bär et al. | |
| 7,172,299 B2 | 2/2007 | Smith et al. | |
| 7,192,145 B2 | 3/2007 | Ealey | |
| 7,195,361 B2 | 3/2007 | Ealey | |
| 2002/0110164 A1 * | 8/2002 | Vetrovec | 372/36 |
| 2003/0147162 A1 * | 8/2003 | Bennett et al. | 359/849 |
| 2004/0150871 A1 * | 8/2004 | Yang | 359/291 |
| 2007/0041108 A1 * | 2/2007 | Nagashima et al. | 359/846 |
| 2008/0007851 A1 * | 1/2008 | Knowles et al. | 359/846 |

OTHER PUBLICATIONS

Mark A. Ealey and John A. Wellman, "Deformable Mirrors: Design Fundamentals, Key Performance Specifications, and Parametric Trades," SPIE vol. 1543 Active and Adaptive Optical Components (1991), pp. 39, 41, 45.*
Michael Little, Elastomer adds muscle to optical MEMS. EE Times [online], [retrieved on Nov. 10, 2011]. Retrieved from the Internet <URL: http://www.eetimes.com/General/DisplayPrintViewContent?contentItemID=4163870>.*

* cited by examiner

*Primary Examiner* — Stephone Allen
*Assistant Examiner* — Kimberly N Kakalec
(74) *Attorney, Agent, or Firm* — Connolly Bove Lodge & Hutz LLP

(57) ABSTRACT

A deformable mirror includes a plurality of block segments and at least one actuator. The block segments are arranged in an array, with adjacent block segments being coupled together by an elastomer and the top surface of the array being reflective. The at least one actuator is coupled to at least one of the block segments at the bottom surface of the array and is adapted to adjust in piston.

54 Claims, 10 Drawing Sheets

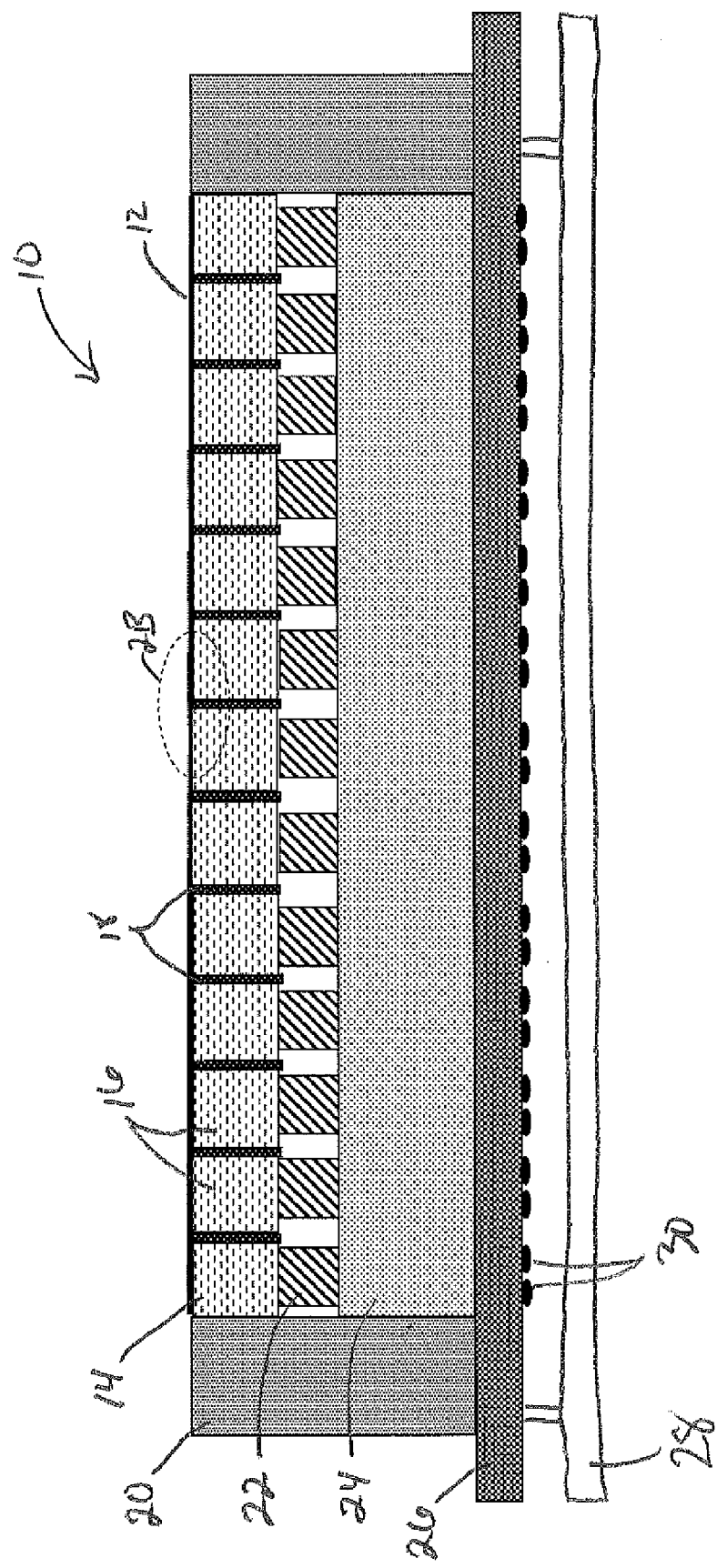

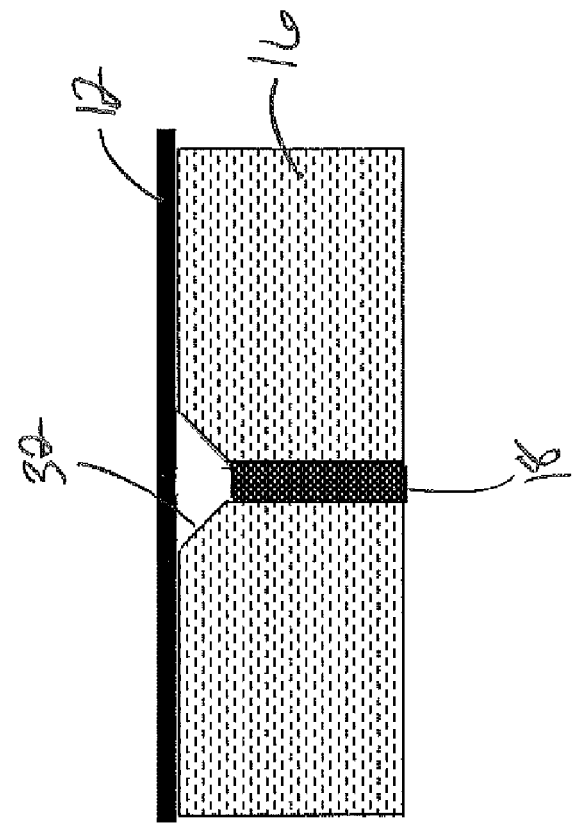
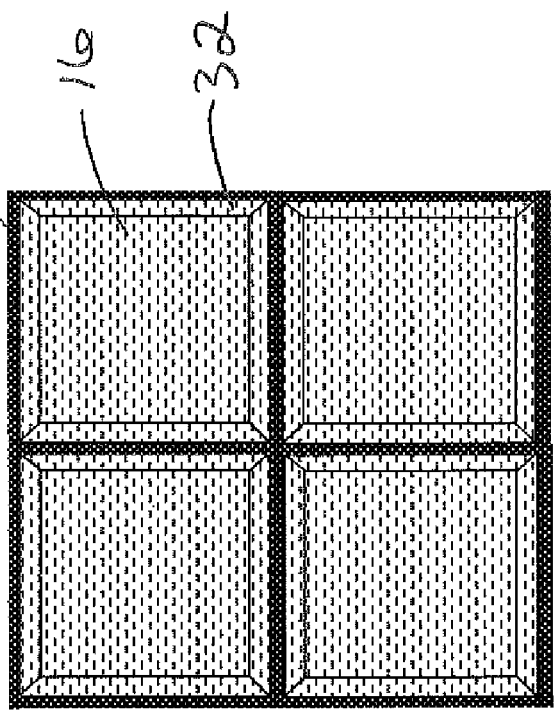

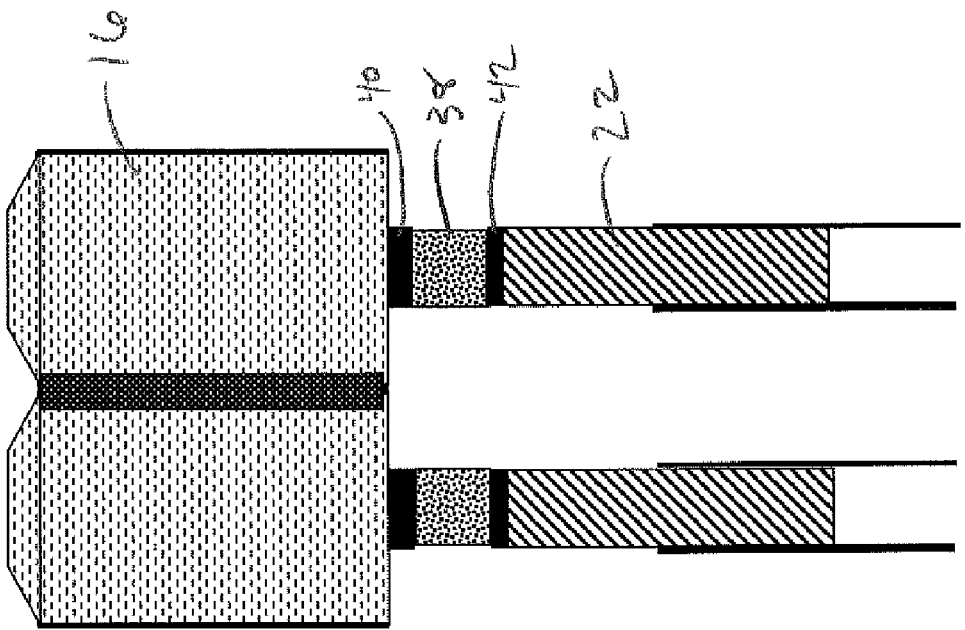
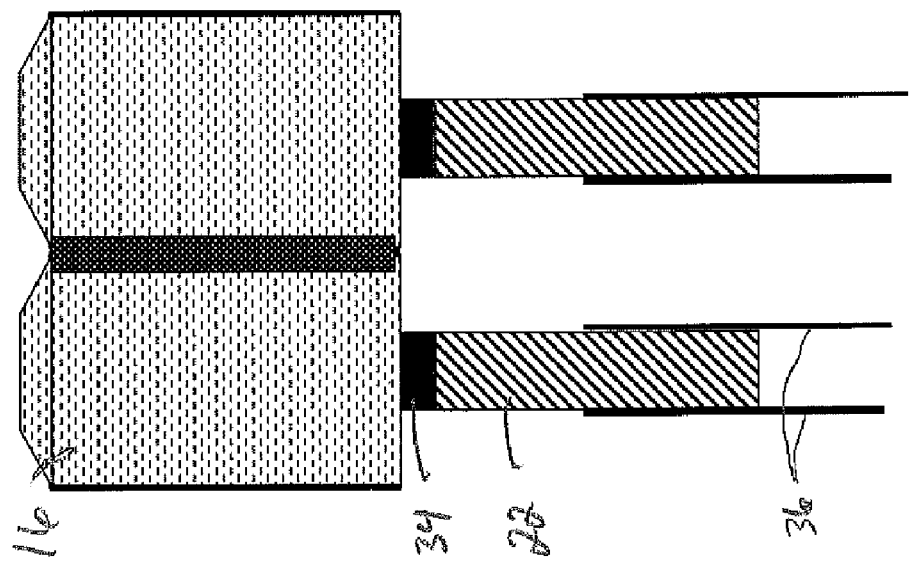

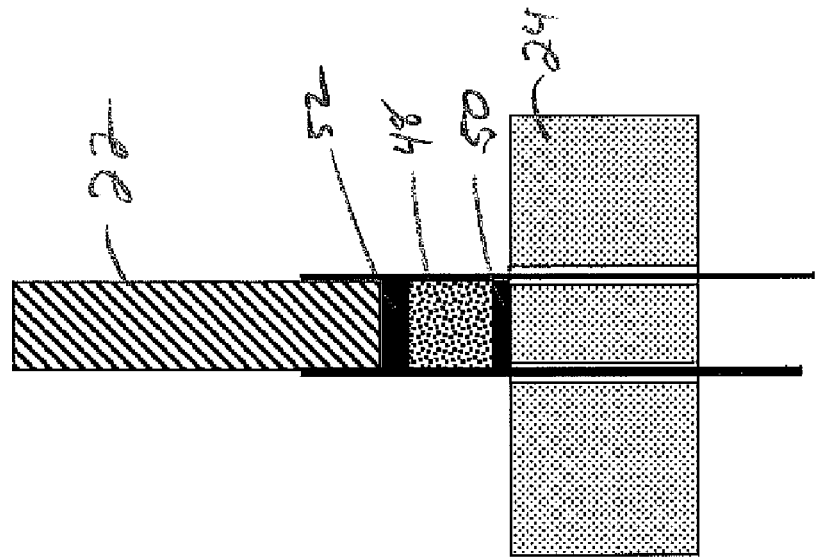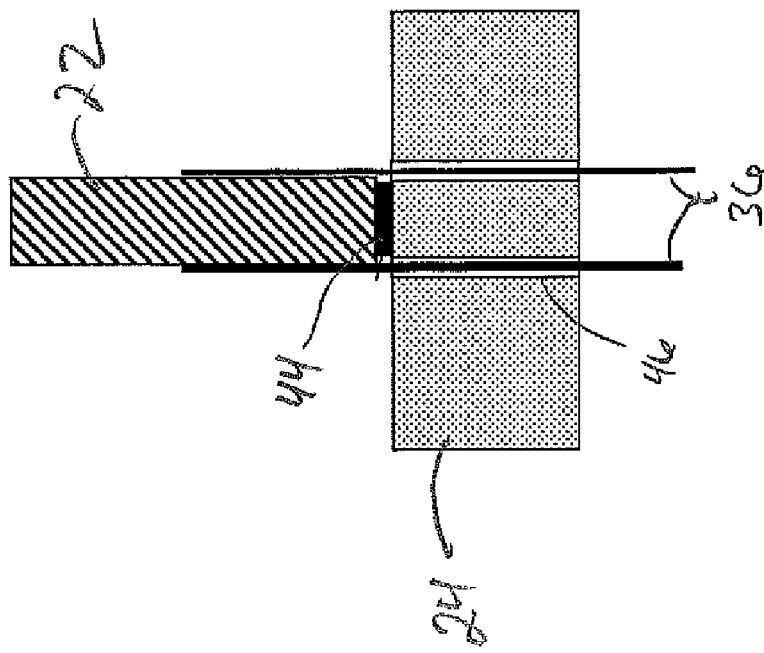

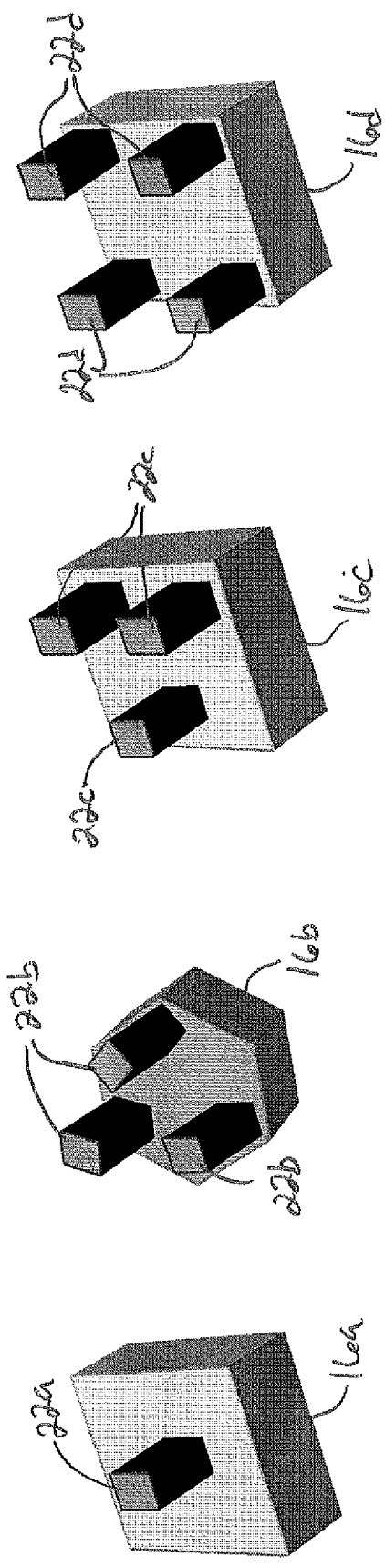

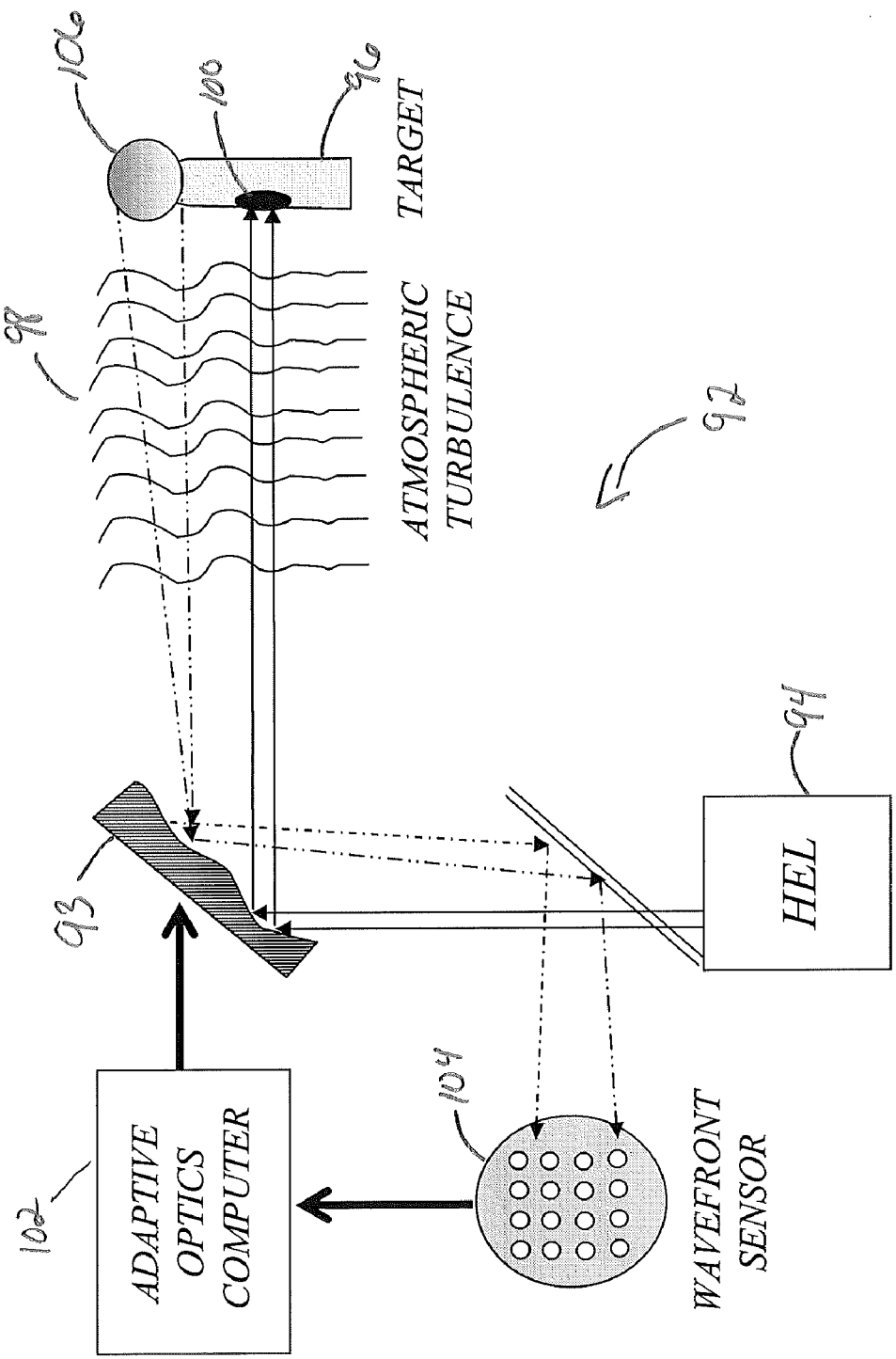

DEFORMABLE MIRROR

BACKGROUND OF THE INVENTION

1. Field of the Invention

The field of the present invention is deformable mirrors.

2. Background

Deformable mirrors are mirrors whose reflective surfaces can be deformed in a manner that allows for control of the wavefront of the reflected light. The need for deformable mirrors arises in adaptive optics for wavefront control and correction of optical aberrations. Deformable mirrors are often used in combination with wavefront sensors in real-time control systems. In such systems, the wavefront sensor communicates the measured wavefront to a computer which determines how the deformable mirror surface should be shaped in order to achieve the desired wavefront. Mechanical or acoustic actuators control the surface shape of the deformable mirror and receive commands from a controller coupled to the computer to shape the surface of the deformable mirror accordingly.

There are two main types of deformable mirrors, continuous faceplate and segmented. Continuous faceplate deformable mirrors have discrete actuators coupled to the back surface of a thin deformable faceplate, and the actuators largely control the surface shape of the faceplate. The overall surface shape of the plate depends on the combination of forces applied to the faceplate, including forces from individual actuators, combinations of actuators, boundary conditions, and the geometry and the material of the plate. Continuous faceplate mirrors are generally preferred over segmented deformable mirrors, since the former allow smooth wavefront control with very large-up to several thousands-degrees of freedom.

Segmented deformable mirrors are formed by independent mirror segments. Each segment may be moved up or down freely with no inter-segment coupling. This type of movement results in a discontinuous surface that is a stepwise approximation of the desired wavefront, and such surfaces work poorly for smooth, continuous wavefronts. Sharp edges of the segments and gaps between the segments contribute to light scattering and heating between the segments. Both of these undesirable effects are amplified when a segmented deformable mirror is used with higher power light sources, thus limiting the applications for such mirrors.

The deformable mirrors commonly used in conjunction with high energy laser (HEL) systems are of the continuous variety. HEL systems generally involve the use of a laser or other source of a high-power directed electromagnetic energy for any one of a number of purposes. During use, the laser heats and can create distortions within the optical system. While a deformable mirror is designed to correct the internal optical distortions, it too is heated and distorted in ways it cannot correct, leading to degradations in HEL performance.

Current high energy level deformable mirrors have a fairly common architecture, consisting of actuators, which are often piezo-stacks, mounted on a base plate and attached to a thin facesheet through metal flexures. Each actuator is adjusted in piston to create an overall deformation of the facesheet, which in turn alters the wavefront of the reflected HEL beam. With this arrangement, the thin facesheet minimizes the bending stiffness of the mirror in response to the pistoning actuators. One shortcoming of this type of deformable mirror design is that it is subject to significant thermal deformation, which causes, optical distortions, when used with high powered lasers or with lasers of lesser power for extended periods of time. The thermal deformation arises because the thin facesheet is heated by the laser and heats up tremendously as compared to the actuators and base plate, resulting in a differential in thermal expansion which twists the flexure attachments to the actuators, thereby causing ripples in the surface of the facesheet. Also, the facesheet and each of the flexure attachments can have a local mismatch in thermal expansion, thereby causing a local curvature above each actuator and a dimple effect across the surface of the facesheet.

With continuous deformable mirrors, there are two potential approaches for reducing optical distortions caused by thermal deformation of the facesheet. One option is to use a thicker facesheet. However, use of a thicker facesheet reduces the flexibility of the deformable mirror surface, and hence reduces the wavefront correction capability. Another option is to use a segmented mirror. However, as discussed above, segmented mirrors have their own shortcomings when used with an HEL beam.

SUMMARY OF THE INVENTION

The present invention is directed toward a deformable mirror. The mirror includes an array of block segments, each being coupled to adjacent block segments by an elastomer, and at least one actuator coupled to one of the block segments on the opposite side of the array, with the actuator being adapted to adjust in piston.

Several different optional modifications may be incorporated into such a deformable mirror. As one option, a plurality of actuators may be used, with at least one actuator coupled to each block segment. Two, three, or more actuators may be coupled to each block segment. With two actuators, each block segment may be moved in piston and tilted in one direction. With three actuators, each block segment may be moved in piston and tilted in two directions. As another option, a reflective facesheet may be affixed to the top surface of the array of block segments. As another option, each actuator may be piezoelectric stacks that provide the appropriate pistoning action. As yet another option, the actuators may be mounted to a baseplate, which itself may thermally coupled to a heating element. Such a heating element would aid in providing thermal balance to the overall structure to help avoid the thermal variances that tend to lead to distortions of the deformable mirror. Further, the actuators may be either directly or indirectly coupled to the baseplate. For indirect coupling, an intermediate material layer may be disposed between the actuator and the baseplate, with a compliant bonding agent coupling the intermediate material layer to the actuator. As an alternative, the intermediate material layer may itself be a flexure. The actuators may be coupled to the block segments in a similar manner. As an additional option, the facesheet may be bonded to the array of blocks. As yet another option, the blocks may include beveled edges at the top surface. As yet another option, the blocks and the reflective facesheet may have substantially similar thermal expansion coefficients. As yet another option, the blocks may include interconnected ducts to aid in providing active cooling to the deformable mirror. As yet another option, the baseplate may include a heating element so that the temperature of the deformable mirror may be equalized. Any of the foregoing options may be employed singly or in any desired combination as part of a deformable mirror.

Accordingly, an improved deformable mirror is disclosed. Advantages of the improvements will appear from the drawings and the description of the preferred embodiment.

BRIEF DESCRIPTION OF THE DRAWINGS

In the drawings, wherein like reference numerals refer to similar components:

FIG. 1 schematically illustrates a cross-sectional view of a deformable mirror;

FIG. 2B schematically illustrates a detailed partial cross-sectional view of the deformable mirror along a single row of actuators;

FIG. 2C is a detailed top view of the indicated section of FIG. 2B;

FIGS. 3A & 3B schematically illustrate two different configurations for coupling the actuators to the block segments;

FIGS. 4A & 4B schematically illustrate two different configurations for coupling the actuators to the baseplate;

FIGS. 5A-D schematically illustrate four different geometrical configurations for coupling the actuators to the block segments;

FIG. 9 schematically illustrates a deformable mirror incorporated as part of an adaptive optics beam control system.

DETAILED DESCRIPTION OF THE PREFERRED EMBODIMENTS

Figure 2A:
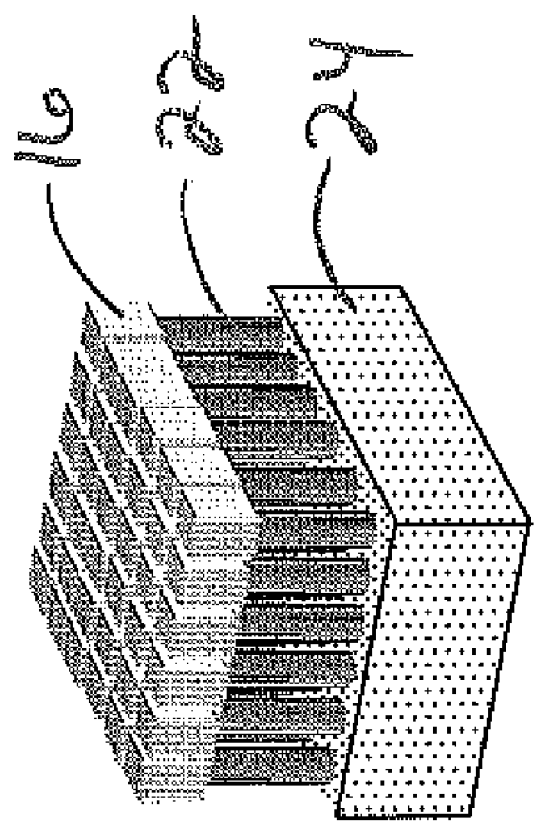
FIG. 2A schematically illustrates a perspective view of an array in a deformable mirror.

Turning in detail to the drawings, FIG. 1 illustrates a deformable mirror 10 in which a facesheet 12 is affixed to the top side of an array 14 of block segments 16 with a bonding agent, which may create either a compliant or noncompliant bond. A single row of the array 14 is shown, and the full array may be formed from a plurality of rows, each row having as many block segments as needed for a particular application. As an example, 6×6 array of block segments 16, without the facesheet, is illustrated in FIG. 2A. Returning to FIG. 1, the facesheet 12 is coupled to the block segments 16, and each of the block segments 16 is coupled to adjacent blocks, using an elastomeric bonding agent 18. The elastomeric bonding agent 18, which provides a compliant bond, allows the block segments 16 to piston up and down with respect to each other without overstressing the material. This type of bonding also aids dampening mechanical vibrations that might otherwise be introduced into the facesheet. With this configuration, and by appropriate selection of materials that are not heat insulators, the array 14 of block segments 16 acts as a heat sink for heat generated by HEL beam exposure, thus aiding to prevent thermal deformation in the facesheet 12. Edge plates 20 are positioned adjacent the array 14 of block segments 16 on all sides of the array 14 to at least provide structural reinforcement. By appropriate selection of a material for the edge plates 20, i.e., a material which is not a heat insulator, the ability of the deformable mirror 10 to dissipate heat away from the facesheet 12 is increased by having the edge plates 20 act as a passive heat sink.

Although the block segments 16 themselves could form the reflective surface and significantly dissipate heat from HEL beam exposure, such a configuration could still give rise to beam scatter due to the edges of the block segments 16. Inclusion of the facesheet 12 aids in eliminating these issues by providing a continuous surface on top of the block segments 16. The thickness of the facesheet 12 may vary according to design requirements, depending upon factors such as beam energy, beam wavelength, choice of materials, and the like. Also, the rate of heat absorption by the facesheet can be minimized by application of a high-reflectivity coating.

A plurality of actuators 22, each of which is coupled to one of the block segments 16, opposite the facesheet 12, and to a baseplate 24, are adjustable in piston. Piezoelectric stacks, which are commonly available components, may be used as the actuators. Such piezoelectric stacks provide a sufficient range of movement in response to applied voltage, and thus aid in appropriate deformation of the facesheet for wavefront shaping. At least one actuator 22 is coupled to each block segment. Two actuators may be coupled to each block segment to enable two dimensions of movement, namely piston and either tip or tilt, depending upon the configuration. With three actuators coupled to each block segment, movement in each of piston, tip, and tilt is enabled.

The baseplate 24 supports the actuators 12. A communication board 26 is affixed to the underside of the baseplate 24, and an additional driver electronics board 28 is affixed and electronically coupled to the communication board 26. The communication board 26 includes electrical contact points 30 for each of the actuators 22, thus enabling the circuitry included on the driver electronics board 28 to drive the actuators 22 through control of the voltage at the respective electrical contact points 30 for each actuator 22. Additional driver electronics boards may be included as necessary. Such control circuitry is well known to those skilled in the art. This design of the deformable mirror 10 eliminates the need for a large rack-mounted driver box with many cables, thus forming a complete deformable mirror subsystem that may be easily incorporated into a larger optical system.

FIG. 2B shows a detailed view of two adjacent block segments 16 and the facesheet 12 coupled thereto. As indicated, the block segments 16 are coupled together using an elastomeric bonding agent 18. One method that may be used to bond adjacent block segments 16 is to apply a low modulus elastomeric adhesive to the abutting faces of the block segments 16 and cure the epoxy to establish the bonds. The thickness of the elastomer between adjacent block segments 16 may vary significantly, depending upon design requirements. The properties and thickness of the elastomer are chosen such that no more than a negligible amount of added force, due to the elastomer, is required to piston one block segment relative to adjacent block segments.

The elastomeric bond between adjacent block segments 16 performs at least two functions. First, the bonds allow the block segments to piston with respect to each other without overstressing the material. Second, the bonds provide damping, which minimizes optical resonances. By way of example, the deformable mirror 10 shown in FIG. 1 has demonstrated a first optical resonance greater than 7.5 KHz. As illustrated in both FIGS. 2B & 2C, the top surface edges 32 of each block segment 16 are chamfered to reduce stress on the block segment edges and on the facesheet 12 as adjacent block segments piston with respect to one another.

FIG. 3A shows adjacent block segments 16, each directly coupled to a single actuator 22. Here, the block segments 16 are directly coupled to the actuators 22 with a bonding agent 34. The bonding agent 34 may create either a compliant or a noncompliant bond between a block segment 16 and its respective actuator 22, depending upon the characteristics of the motion desired. A compliant bond is functionally the same as a flexure, such as are used with deformable mirrors of the prior art. As an option, to maximize the flexure ability for a specific application, a block segment can be divided into layers that are bonded together with compliant bonds. The material thickness and shape of segment layers would be selected according to the specific demands of the application.

The actuators 22 shown are of the piezoelectric stack variety, having two wire leads 36. As is known in the art, the difference in voltage applied to each lead controls the length of the piezo stack, such that when the stack gets longer, the actuator pistons up, and when the stack gets shorter, the actuator pistons down, When the actuator is adjusted in piston, the coupled block segment is displaced, and for the configuration shown in FIG. 3A, the displacement is linear. For other configurations, such as those discussed below, in which multiple actuators are coupled to a single block segment, rotational displacement, or even a combination of linear and rotational displacement, may be achieved by selectively pistoning one or more of the coupled actuators.

FIG. 3B shows adjacent block segments 16, each indirectly coupled to a single actuator 22. An intermediate layer 38 is sandwiched between the two bonding agent layers 40, 42. The materials here may be chosen based upon the specific demands of the application. For example, the intermediate layer 38 may be a ceramic wafer, with the first bonding agent layer 40 forming a noncompliant bond, and the second bonding agent layer 42 forming a compliant bond. In another example, the intermediate layer 38 may be a flexure, and both bonding agent layers 40, 42 may form noncompliant bonds.

FIG. 4A shows an actuator 22 directly coupled to the baseplate 24. A bonding agent layer 44 creates the coupling bond. As with other parts of the deformable mirror, this bonding agent layer 44 may form either a compliant or a noncompliant bond, depending upon the characteristics of the motion desired. The actuator 22 shown is of the piezoelectric stack variety, and includes two wire leads 36 extending through holes 46 formed in the baseplate 24. After passing through the holes 46, the wire leads may be soldered or otherwise electrically connected to the electrical contact points on the associated communication board. FIG. 4B shows an actuator 22 indirectly coupled to the baseplate 24. An intermediate layer 48 is sandwiched between two bonding agent layers 50, 52. The materials here may be chosen based upon the specific demands of the application. For example, the intermediate layer 48 may be a ceramic wafer, with the first bonding agent layer 50 forming a noncompliant bond, and the second bonding agent layer 52 forming a compliant bond. Alternatively, the intermediate layer 48 may be a flexure, with both bonding agent layers 50, 52 forming noncompliant bonds.

FIGS. 5A-D show some options for geometrically arranging actuators with respect to the block segments. FIG. 5A shows a single actuator 22a coupled to a square-faced block segment 16a, thereby providing pistoning capability to the block segment. FIG. 5B shows three actuators 22b coupled to a hexagonal-faced block segment 16b and FIG. 5C likewise shows three actuators 22c coupled to a square-faced block segment 16c. Both of these configurations provide piston, tip, and tilt capability to movement of the block segment. The configuration shown in FIG. 5C is preferred for a deformable mirror having square block segments and a square array arrangement. FIG. 5D shows four actuators 22d coupled to a square-faced block segment 16d. The fourth actuator serves to add redundancy as compared to the configuration of FIG. 5C.

As can be seen from FIG. 5B, the block segments need not be four sided, or even arranged in a rectangular fashion, as other polygonal or curved shapes may be used. Further, the block segments may be of different shapes and sizes, as compared to other block segments in the array, and the array arrangement can follow any pattern, or lack thereof, form a rectangular pattern, a hexagonal pattern, or even no pattern, with a more or less random distribution and alignment of the block segments. Similarly, abutting faces of adjacent block segments may be other than planar and right angled to the end faces of the block segment—they may be at any angle and have any form that is complimentary to adjacent block segments, e.g., curved, teethed, or otherwise irregular, thereby allowing the desired motion for the array, whether that motion be piston, tip, tilt, or any combination thereof. The array and block segments forming the array may take any form or arrangement desirable, limited only by the specific demands of the application.

Figure 6B:
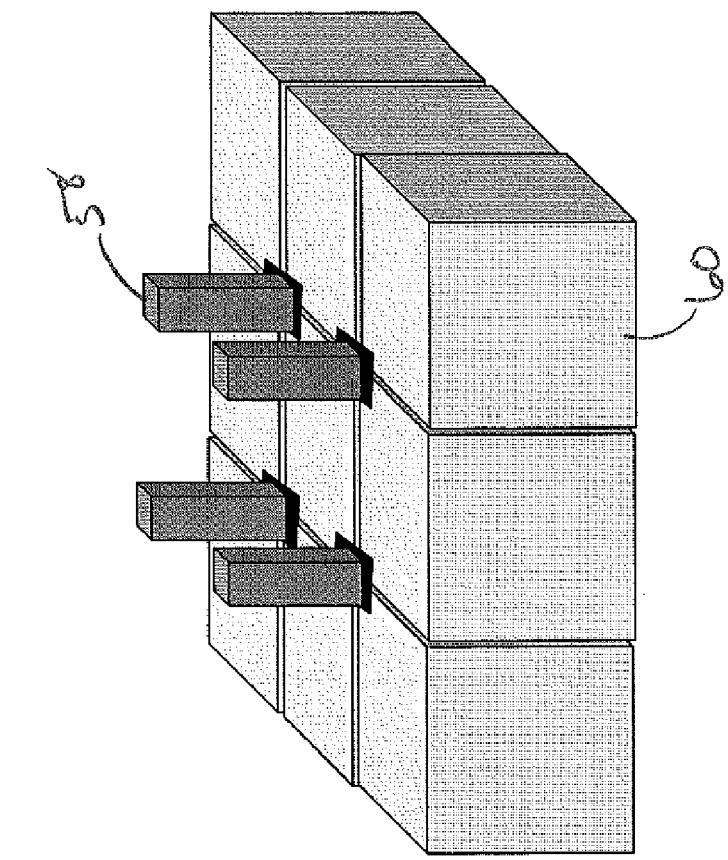
FIGS. 6A & 6B schematically illustrate two different geometrical configurations for coupling the actuators to the vertices of adjacent block segments.
Figure 6A:
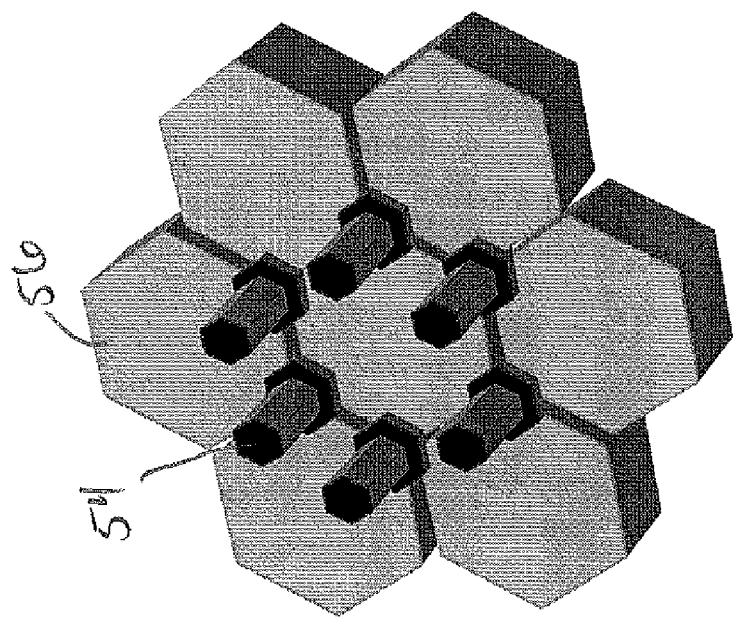

FIG. 6A shows an alternate geometry for coupling actuators 54 to hexagonal faced block segments 56, which are also tiled hexagonally. Each actuator 54 is coupled to multiple adjacent block segments 56, so that each actuator 54 will control the positioning of the adjacent block segments 56. Depending upon the geometry used and the positioning of the actuator, a single actuator may be coupled to two, three, four, or more adjacent block segments. As with coupling a single actuator to a single block segment, both direct and indirect bonding may be used. FIG. 6B illustrates yet another tiling geometry, this one showing actuators 58 coupled to adjoining square-faced block segments 60 arranged in a square array pattern.

Figure 7:
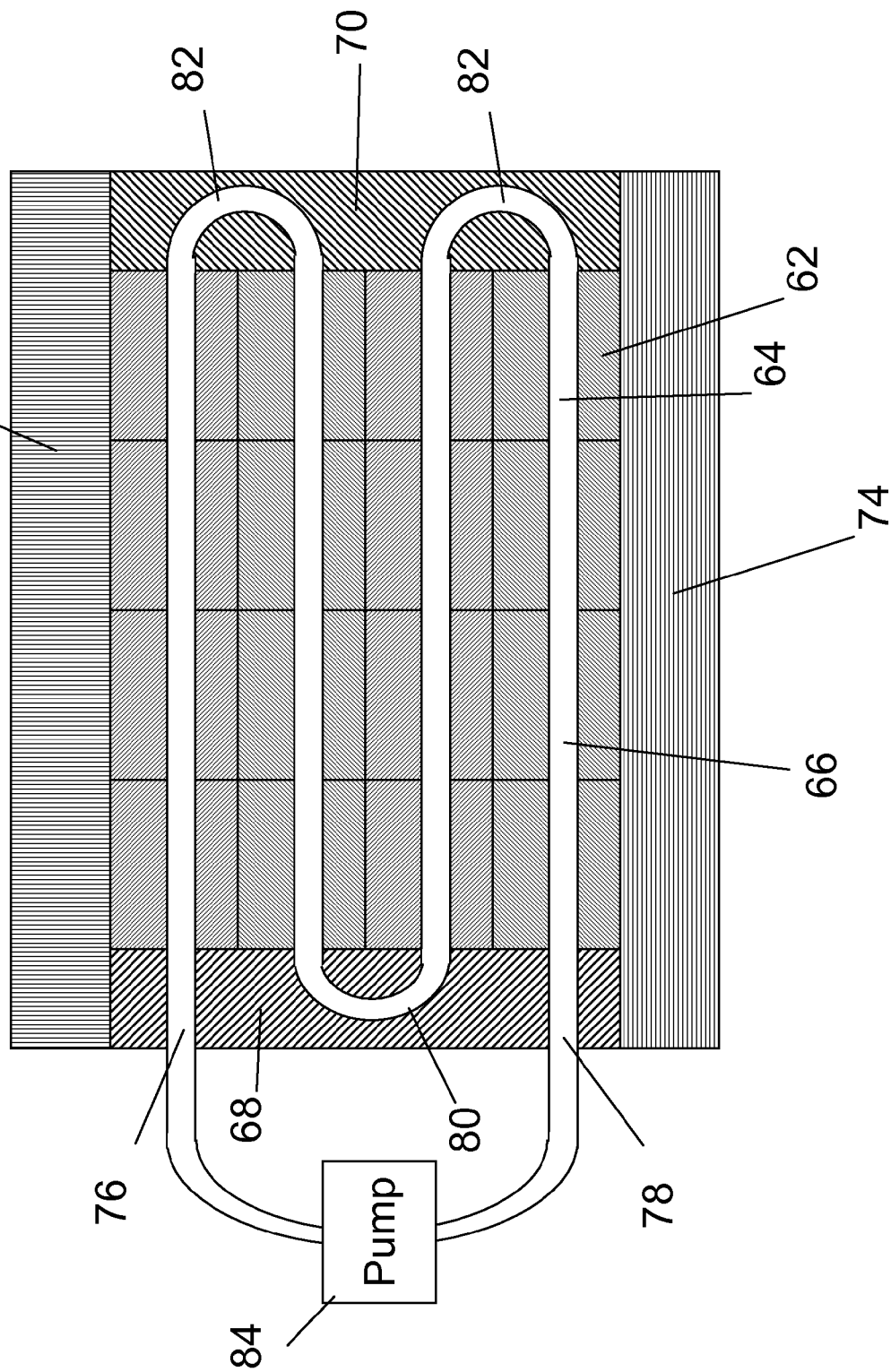
FIG. 7 illustrates a cross-sectional view of a deformable mirror having cooling channels.

A deformable mirror that may be actively cooled is shown in FIG. 7, which illustrates the cross section through the block segments of the cooled mirror parallel to the baseplate. Each block segment 62 includes a duct 64 extending therethrough, and the ducts 64 of block segments 62 in a row of the array are aligned to form a channel 66 passing through the entire row. The elastomeric bonds between block segments serve to create a seal between ducts in adjacent block segments. Four edge plates 68, 70, 72, 74, with two of the edge plates 72, 74 being as described above. The other two edge plates 68, 70 include channels to fluidically connect the channels 66 formed by each of the rows of block segments 62. The first edge plate 68 includes an inlet channel 76 and an outlet channel 78 for a cooling fluid or gas and an interconnect channel 80 to fluidically connect channels 66 from two adjacent rows. The second edge plate 70 includes two interconnect channels 82, each of which also fluidically connects channels 66 from two adjacent rows. The combination of the channels 66 formed by the rows and the interconnect channels 80, 82 results in a single long channel passing through every block segment 62 of the array. By connecting an appropriate liquid or gas pump 84, as appropriate for the chosen cooling medium, to the inlet channel 76 and outlet channel 78, the entire array may be actively cooled by having a cooling medium flow through all the block segments of the array.

Figure 8A:
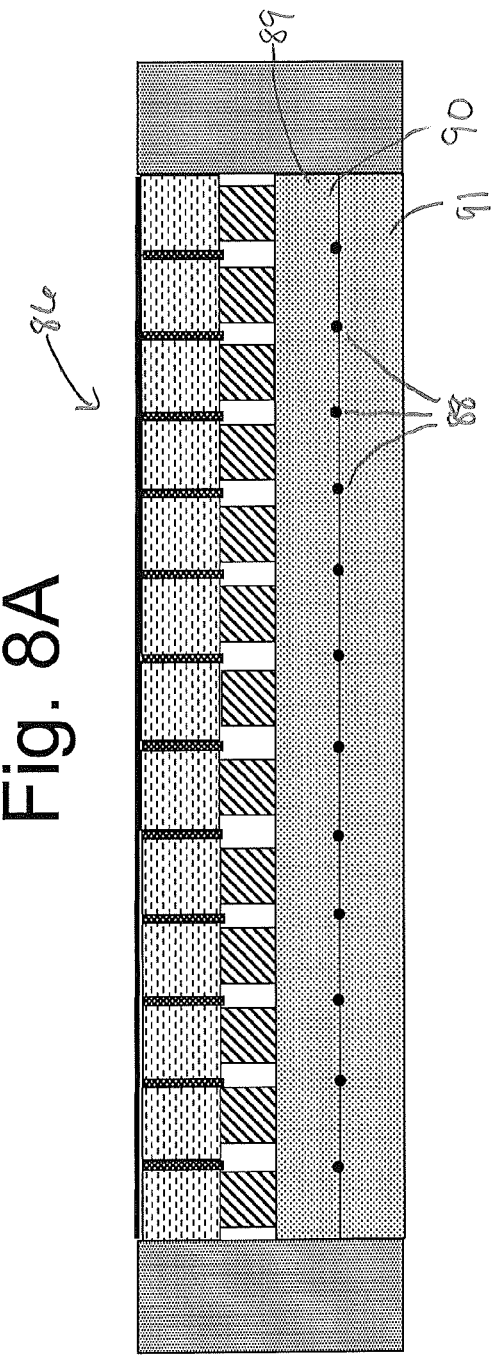
FIG. 8A schematically illustrates a cross-sectional view of a deformable mirror incorporating heating elements.
Figure 8D:
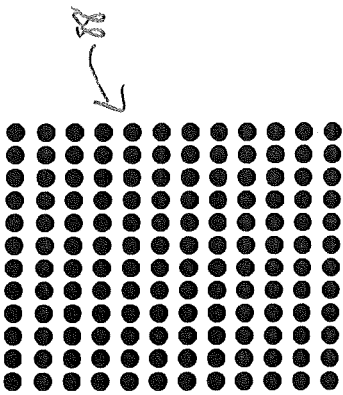
FIGS. 8B-D illustrate alternative configurations for heating elements incorporated into the deformable mirror of FIG. 8A.
Figure 8C:
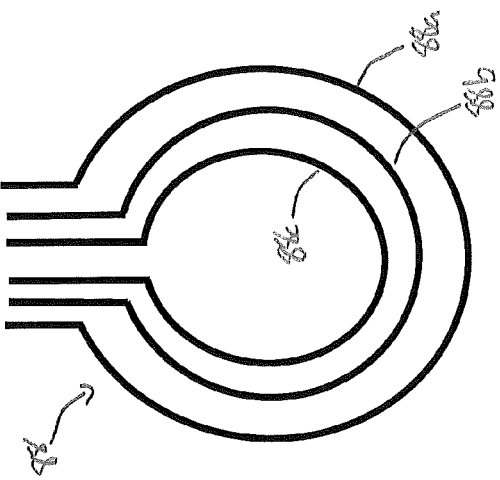
Figure 8B:
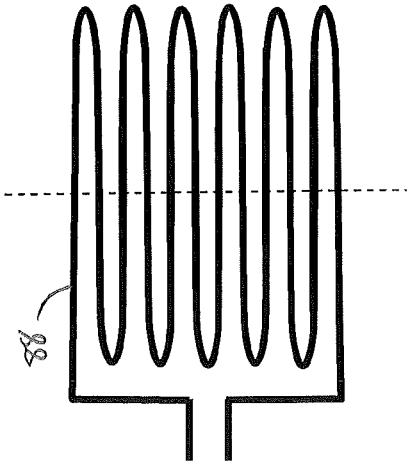

As an alternative to active cooling, for less thermally stressing HEL exposure, the baseplate of the deformable mirror can be actively heated to equalize the overall temperature of the deformable mirror and substantially, or completely, eliminate global thermal concave bowing of the facesheet. Active heating aids in restoring the stroke of the actuators to nearly their full capacity. In addition, baseplate heating can significantly reduce the local thermal ripple when a single actuator is used per block segment, as shown in FIG. 5A. FIG. 8A shows a deformable mirror 86 with a heating element 88 incorporated into the baseplate 89. The deformable mirror 86 of this design includes a two-layer baseplate 89. The two layers 90, 91 of the baseplate 88 are bonded with a thermally conductive, noncompliant bonding agent, such as an epoxy. The heating element 88 is sandwiched between the two baseplate layers 90, 91 to enable heating of the baseplate 89. Although not shown, appropriately located heat sensors and temperature control circuitry may also be included as part of the deformable mirror 86 to provide fine temperature control over heat generated by the heating element 88. The heating element 88 may be any type of appropriate material known to those of skill in the art. For example, nickel-chromium resistance wire may be used as the heating element 88. The heating element 88 may be arranged to provide either uniform or non-uniform heating of the baseplate 89, depending upon the specific needs of the application. FIG. 8B shows a configuration for a heating element 88 formed from nickel-chromium resistance wire which will provide uniform heating. FIG. 8C shows a configuration for a heating element 88 formed from three separate concentric strands 88a, 88b, 88c of nickel-chromium resistance wire, each of which may be independently supplied with an electric current to provide non-uniform heating to the baseplate 90 baseplate 89. FIG. 8D shows a configuration of a heating element 88 formed from a plurality of independently accessible heating spots. This configuration allows great flexibility in heating the baseplate 89, regardless of whether uniform or non-uniform heating is desired, and would provide the capability of independently heating the baseplate 89 under each block segment in the array as needed or desired.

The deformable mirror as described above is preferably constructed with the various parts having similar thermal expansion coefficients. The easiest way of ensuring this is by constructing each of the facesheet, the block segments, the base plate, and the edge plates from silicon. Silicon is a high thermal conductivity and low thermal expansion material. Where different materials are used to construct the various parts, the demands and tolerances of the particular application will determine how substantially similar the thermal expansion coefficients should be.

As indicated above, when three actuators are coupled to each block segment, piston, tip, and tilt control of each segment is enabled in a straightforward manner. Thus, the deformable mirror described herein introduces three times as many degrees of freedom as with a piston-only design. The benefit is that the fitting error for such a deformable mirror is much less than those in the prior art. A typical fitting error model for a continuous facesheet mirror has a coefficient of 0.32 times $(d_{act}/r_o)^{5/3}$ while a segmented mirror has a coefficient of only 0.175 (1.8× smaller), as expressed in the equation below where $d_{act}$ represents the actuator spacing, $r_o$ atmospheric turbulence, and $\sigma_{con}$ and $\sigma_{seg}$ are fitting model standard deviations:

$$\sigma_{con}^2 = 0.32\left(\frac{d_{act}}{r_o}\right)^{\frac{5}{3}}$$

$$\sigma_{seg}^2 = 0.175\left(\frac{d_{act}}{r_o}\right)^{\frac{5}{3}}$$

The deformable mirror described herein can thus be designated as the primary mirror of an optical train, thereby eliminating the reimaging step commonly required for wavefront correction. Since reimaging requires sending the high energy beam through focus, elimination of the reimaging step is highly desirable.

FIG. 9 shows a simplified adaptive optics beam control system 92 having a deformable mirror assembly 93 incorporated therein. An HEL 94 generates a beam which is directed toward a target 96 through atmospheric turbulence 98, thereby forming a spot 100 on the target 96. The wavefront of the HEL beam determines the characteristics of the spot 100, and that wavefront is in turn determined by the surface profile of the deformable mirror assembly 93, which itself is controlled by the adaptive optics computer 102. In order to control the characteristics of the spot 100, the wavefront sensor 104 receives return light from a beacon 106 through essentially the same atmospheric turbulence 98. The beacon 106 could be a light source on the target 96 or a spot formed on the target 96 from an external light source illuminating the target 96. In a manner known to those of skill in the art, data from the wavefront sensor 104 allows the adaptive optics computer 102 to determine the optimum shape for the deformable mirror assembly 93 surface profile so that the HEL beam spot 100 on the target 96 has the desired characteristics. By way of a short explanation, the adaptive optics computer 102 sends commands to the driver electronics of the deformable mirror assembly 93 to set the voltages to be applied to each actuator within the deformable mirror. This causes the surface of the deformable mirror to change, which in turn changes the characteristics of the HEL spot 100 on the target 96. Since the atmospheric turbulence continuously changes, this process gets repeated with continuous data received by the wavefront sensor 104.

Thus, a deformable mirror is disclosed. While embodiments of this invention have been shown and described, it will be apparent to those skilled in the art that many more modifications are possible without departing from the inventive concepts herein. The invention, therefore, is not to be restricted except in the spirit of the following claims.

What is claimed is:

1. A deformable mirror comprising:
   a plurality of block segments arranged in an array, wherein a top surface of the array is reflective, wherein a thermally conducting elastomeric material is disposed between and couples together adjacent block segments; and
   a plurality of actuators, each actuator coupled to one of the block segments at a bottom surface of the array and configured to adjust the respective coupled block segment in piston.

2. The deformable mirror of claim 1, the at least one actuator comprising a plurality of actuators, wherein at least one of the actuators is coupled to each block segment at the bottom surface of the array.

3. The deformable mirror of claim 2, wherein at least two of the actuators are coupled to each block segment at the bottom surface of the array.

4. The deformable mirror of claim 2, wherein three of the actuators are coupled to each block segment at the bottom surface of the array.

5. The deformable mirror of claim 1, wherein each actuator comprises a piezoelectric stack.

6. The deformable mirror of claim 1, further comprising a baseplate, each actuator being affixed between the baseplate and one of the block segments.

7. The deformable mirror of claim 6, further comprising a heating element thermally coupled to the baseplate.

8. The deformable mirror of claim 6, wherein each actuator is indirectly affixed to the baseplate through an intermediate material layer.

9. The deformable mirror of claim 8, wherein the intermediate material layer comprises a flexure.

10. The deformable mirror of claim 8, wherein the actuator and the intermediate material layer are bonded together by a compliant bonding agent.

11. The deformable mirror of claim 6, wherein the baseplate comprises:
   a first baseplate layer;
   a second baseplate layer;

a thermally conductive bonding agent affixing the first baseplate layer to the second baseplate layer; and a heating element disposed between the first and second baseplate layers.

12. The deformable mirror of claim 11, wherein the thermally conductive bonding agent comprises a thermally conductive, noncompliant epoxy.

13. The deformable mirror of claim 11, wherein the heating element is adapted to heat the baseplate layers in a non-uniform manner.

14. The deformable mirror of claim 11, wherein the heating element comprises a nickel-chromium resistance wire.

15. The deformable mirror of claim 1, wherein each actuator is indirectly coupled to at least one of the block segments through an intermediate material layer.

16. The deformable mirror of claim 15, wherein the intermediate material layer comprises a flexure.

17. The deformable mirror of claim 15, wherein the actuator and the intermediate material layer are bonded together by a compliant bonding agent.

18. The deformable mirror of claim 1, wherein the elastomer has a low modulus of elasticity.

19. The deformable mirror of claim 1, wherein edges of each block segment near the top surface of the array are chamfered.

20. The deformable mirror of claim 1, wherein the array comprises a facesheet disposed at the top surface of the array.

21. The deformable mirror of claim 20, wherein the facesheet is affixed to the block segments.

22. The deformable mirror of claim 21, wherein the facesheet is bonded to the block segments.

23. The deformable mirror of claim 20, wherein the facesheet includes a reflective coating.

24. The deformable mirror of claim 20, wherein the block segments and facesheet are formed from silicon.

25. The deformable mirror of claim 20, wherein the block segments and the facesheet have substantially similar thermal expansion coefficients.

26. The deformable mirror of claim 1, further comprising a plurality of edge plates disposed about a periphery of the array.

27. The deformable mirror of claim 1, wherein each block segment includes a duct formed therethrough, with the ducts of adjacent block segments in each row of the array being fluidically connected to form a channel.

28. The deformable mirror of claim 27, further comprising an interconnect channel fluidically connecting the channels formed in two or more rows.

29. The deformable mirror of claim 28, further comprising a pump adapted to circulate one of a gas or a liquid through the fluidically connected channels.

30. A deformable mirror comprising:
a plurality of block segments arranged in an array;
a compliant bonding agent disposed between and mechanically coupling adjacent block segments within the array;
a reflective facesheet affixed to the top surface of the array; and
a plurality of actuators, wherein each actuator is coupled to one of the block segments at a bottom surface of the array and configured to adjust the respective coupled block segment in piston.

31. The deformable mirror of claim 30, wherein at least one of the actuators is coupled to two of the block segments at the bottom surface of the array.

32. The deformable mirror of claim 30, wherein three of the actuators are coupled to each block segment at the bottom surface of the array.

33. The deformable mirror of claim 30, wherein each actuator comprises a piezoelectric stack.

34. The deformable mirror of claim 30, further comprising a baseplate, each actuator being affixed between the baseplate and one of the block segments.

35. The deformable mirror of claim 34, further comprising a heating element thermally coupled to the baseplate.

36. The deformable mirror of claim 34, wherein each actuator is indirectly affixed to the baseplate through an intermediate material layer.

37. The deformable mirror of claim 36, wherein the intermediate material layer comprises a flexure.

38. The deformable mirror of claim 36, wherein the actuator and the intermediate material layer are bonded together by a compliant bonding agent.

39. The deformable mirror of claim 36, wherein the thermally conductive bonding agent comprises a thermally conductive, noncompliant epoxy.

40. The deformable mirror of claim 36, wherein the heating element is adapted to heat the baseplate layers in a non-uniform manner.

41. The deformable mirror of claim 36, wherein the heating element comprises a nickel-chromium resistance wire.

42. The deformable mirror of claim 34, wherein the baseplate comprises:
a first baseplate layer;
a second baseplate layer;
a thermally conductive bonding agent affixing the first baseplate layer to the second baseplate layer; and
a heating element disposed between the first and second baseplate layers.

43. The deformable mirror of claim 30, wherein each actuator and block segment are indirectly coupled together through an intermediate material layer.

44. The deformable mirror of claim 43, wherein the intermediate material layer comprises a flexure.

45. The deformable mirror of claim 43, wherein the actuator and the intermediate material layer are bonded together by a compliant bonding agent.

46. The deformable mirror of claim 30, wherein the elastomer has a low modulus of elasticity.

47. The deformable mirror of claim 30, wherein the reflective facesheet includes a reflective coating.

48. The deformable mirror of claim 30, wherein the reflective facesheet is bonded to the top surface of the array.

49. The deformable mirror of claim 30, wherein the blocks and reflective facesheet are formed from silicon.

50. The deformable mirror of claim 30, wherein the blocks and the reflective facesheet have substantially similar expansion coefficients.

51. The deformable mirror of claim 30, further comprising a plurality of edge plates disposed about a periphery of the array.

52. The deformable mirror of claim 30, wherein each block segment includes a duct formed therethrough, with the ducts of adjacent block segments in each row of the array being fluidically connected to form a channel.

53. The deformable mirror of claim 52, further comprising an interconnect channel fluidically connecting the channels formed in two or more rows.

54. The deformable mirror of claim 53, further comprising a pump adapted to circulate one of a gas or a liquid through the fluidically connected channels.

* * * * *